United States Patent
Ehlenbröker et al.

(10) Patent No.: US 9,900,463 B2
(45) Date of Patent: Feb. 20, 2018

(54) SYSTEM FOR SIMPLE CODING, AUTHENTICATION AND COPY DETECTION OF PRINTED DOCUMENTS

(71) Applicant: KBA-NOTASYS SA, Lausanne (CH)

(72) Inventors: Jan-Friedrich Ehlenbröker, Lage (DE); Volker Lohweg, Bielefeld (DE)

(73) Assignee: KBA-NotaSys SA, Lausanne (CH)

(*) Notice: Subject to any disclaimer, the term of this patent is extended or adjusted under 35 U.S.C. 154(b) by 0 days.

(21) Appl. No.: 15/114,422

(22) PCT Filed: Jan. 28, 2015

(86) PCT No.: PCT/IB2015/050651
§ 371 (c)(1),
(2) Date: Jul. 27, 2016

(87) PCT Pub. No.: WO2015/114539
PCT Pub. Date: Aug. 6, 2015

(65) Prior Publication Data
US 2016/0352962 A1     Dec. 1, 2016

(30) Foreign Application Priority Data

Jan. 28, 2014  (EP) .................................. 14152788

(51) Int. Cl.
*H04N 1/32* (2006.01)
*G07D 7/2033* (2016.01)
(Continued)

(52) U.S. Cl.
CPC ......... *H04N 1/32149* (2013.01); *G07D 7/005* (2017.05); *G07D 7/2033* (2013.01); *H04N 1/00838* (2013.01); *H04N 2201/327* (2013.01)

(58) Field of Classification Search
CPC ........... H04N 1/32149; H04N 1/00838; H04N 2201/327; G07D 7/005; G07D 7/2033
See application file for complete search history.

(56) References Cited

U.S. PATENT DOCUMENTS

2004/0078333 A1    4/2004  Hilton et al.
2006/0008112 A1*   1/2006  Reed .................... G06T 1/0028
                                                    382/100

FOREIGN PATENT DOCUMENTS

WO         97/40619 A1     10/1997
WO         02/065385        8/2002

OTHER PUBLICATIONS

Ehlenbröker, J.-F.; Lohweg, V.: "Video-Based Data Transfer for Document Authentication", 3. Jahresolloquium "Bildverarbeitung in Der Automation (BVAU)", Centrum Industrial IT, Lemgo, Inlt-Institut Fur Industrielle Informationstechnik, Nov. 2012 (Nov. 1, 2012).*

(Continued)

*Primary Examiner* — Christopher D Wait
(74) *Attorney, Agent, or Firm* — Nixon & Vanderhye P.C.

(57) ABSTRACT

There is described a new coding approach for printed document authentication, one objective of which is to increase the difficulty of copying. In addition, this new coding approach provides better performance compared to other 2D coding technologies under certain constraints. The new coding technique requires less print space in comparison to other coding techniques. This is achieved by optimizing some of the features which are used in standard 2D-codes for stabilization and which are necessary for e.g. mobile applications. Furthermore, the code can be decomposed in elementary units, or "byte-units" which can be widely spread over a text document. Such "byte-units" can in particular be used for integration in text symbols. If a document protected with such a coding is copied, at least some of these symbols will be extensively degraded by the copying process. Therefore, copy detection is intrinsically achieved thanks to the new coding technique.

14 Claims, 9 Drawing Sheets

(51) Int. Cl.
*H04N 1/00* (2006.01)
*G07D 7/005* (2016.01)

(56) References Cited

OTHER PUBLICATIONS

Ericsson Mobility Report, Jun. 2013, 28 pages.
Ehlenbröker, Jan-Friedrich, et al., "Video-Based Data Transfer for Document Authentication," inIT-Institut Industrial IT, Nov. 2012, 10 pages.
Hamming, R. W., "Error Detecting and Error Correcting Codes," The Bell System Technical Journal, vol. 29, No. 2, Apr. 1950, 14 pages.
Herrigel, Alexander, "Mobile Interaction and Document Authentication," The Conference on Optical Security and Counterfeit Deterrence, Jan. 23-25, 2008, 8 pages.
Kamijo, Koichi, et al., "Invisible barcode with optimized error correction," 15th IEEE International Conference on Image Processing (ICIP), Oct. 12-15, 2008, 1 page.
Peiris, Roshan Lalintha, et al., "A dynamic AR marker for a paper based temperature sensor," Lecture Notes in Computer Science: Authors' Instructions, vol. 7040, 2011, 5 pages.
Reed, I. S., et al., "Polynomial Codes Over Certain Finite Fields," Journals of the Society for Industrial and Applied Mathematics, vol. 8, Jun. 1960, 2 pages.
Tan, Keng, et al., "Designing a Color Barcode for Mobile Applications," IEEE Pervasive Computing, vol. 11, Issue 2, Feb. 2012, 1 page.

\* cited by examiner (a) Data Matrix block (b)

Example
This is an illustrative
text, which demonstrates
the coding possibilities
of microIDENT.

In lieu of dots, microIDENT
code symbols are used in this
text.

Example
This is an illustrative
text, which demonstrates
the coding possibilities
of microIDENT.

In lieu of dots, microIDENT
code symbols are used in this
text.

BU

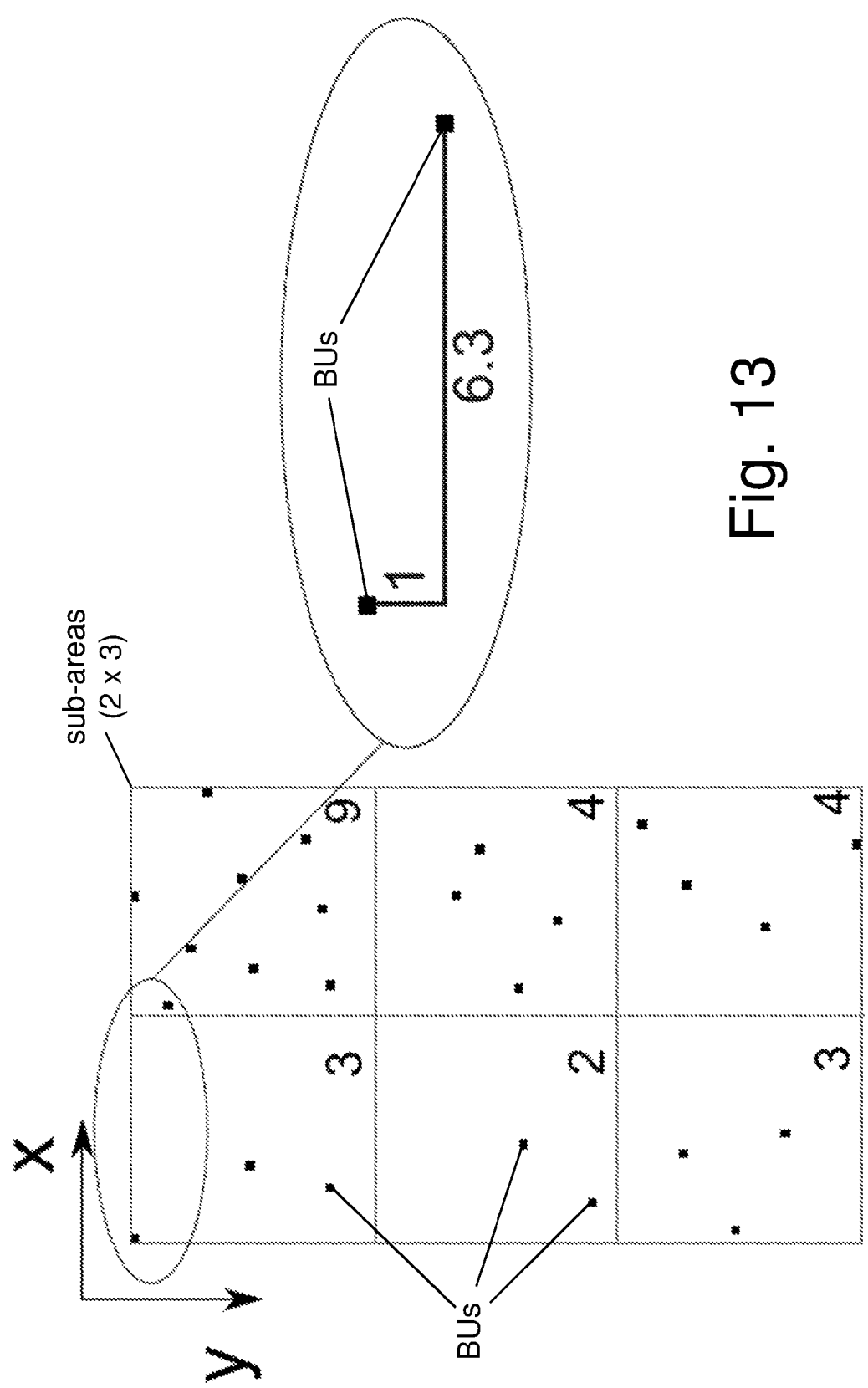

SYSTEM FOR SIMPLE CODING, AUTHENTICATION AND COPY DETECTION OF PRINTED DOCUMENTS

This application is the U.S. national phase of International Application No. PCT/IB2015/050651 filed 28 Jan. 2015, which designated the U.S. and claims priority to EP Patent Application No. 14152788.7 filed 28 Jan. 2014, the entire contents of each of which are hereby incorporated by reference.

The present invention generally relates to coding and authentication of printed documents, as well as measures to detect copy of such printed documents.

1. INTRODUCTION

In a highly automated and digital world it is often necessary to add digital tags to physical objects in order to create a connection between the physical and the digital world. The term "digital tags" describes all kinds of add-ons which are used to make physical objects machine-readable. Simple digital tags only store information (e.g. 2D-codes). Others allow an interaction between the reader and the tag (e.g. RFID, NFC and smart card chips). Tags are useful in several applications. First and foremost, those tags are used for automation processes: They allow faster processing and may also result in a reduction of costs. In addition, the usage of digital tags results in an easier and more user-friendly operation and can therefore reduce errors.

Non-perceptibility of digital information by humans is one of the drawbacks of digital tags. There are also privacy and security concerns especially for those tags which are read without the knowledge of a human user. Depending on the code design, a machine readable code is difficult and impracticable to interpret by a human without the help of technical systems. The present specification focuses on special machine-readable codes which are specifically designed to be read with and processed by cameras and computers. Codes which are based on optical processing are equipped with additional features, e.g., error correction coding or virtual invisibility for the naked eye (cf. [Kamijo2008]).

Described hereinafter is a new 2D-code, hereinafter called "microIDENT" code (or "mIC"), which has the ability to contain a higher amount of data compared to other standard 2D-codes. This is reached by eliminating some typical detection patterns in 2D-codes which are not necessary for document processing via standard office scanners and printers. The microIDENT code is designed in a way that it can be cut into information pieces which can be spread over a security text document. The information pieces will be referred to as "microIDENT code Byte-Units" ("mIC-BUs" or simply "BUs"). The advantage of these mIC-BUs is that they can be hidden in text fonts. After copying they usually change their topology and can therefore be used for copy detection.

The present specification is structured as follows: After this introduction some insights in the related work is given. Furthermore, some foundations in 2D-code design are presented. In the third section the microIDENT approach and design is described. The following section highlights findings and results regarding document authentication. The fifth section concludes this specification.

1.1 SUMMARY OF THE INVENTION

A general aim of the present invention is therefore to provide a simple solution to allow coding, authentication and copy detection of printed documents.

This aim is achieved thanks to the system recited in the claims.

In particular, there is claimed a system for coding, authentication and copy detection of printed documents, wherein a multiplicity of tiny two-dimensional printed code symbols, or byte-units, are scattered across a printed surface of a printed document to form a coding, each byte-unit consisting of a finder pattern to allow localization of the byte-unit and a single data block carrying one byte of data and one parity bit encoded as black and white one-bit modules. According to the invention, the byte-units are scattered across the printed surface of the printed document in the form of printed dots each surrounded by a white quiet zone, the byte-units having a printing size such that the coding is not visible to the naked eye and that the byte-units are degraded as a result of copying the printed document, preventing readout of the coding on a copy of the printed document.

In the context of the present invention, "tiny" means a sufficiently small printing size that ensures that the coding embodied by the individual byte-units is not readily visible to the naked eye and can suitably be hidden in the printed document, while still exhibiting a structure that is inherently degraded as a result of copying as discussed hereafter. In that respect, individual byte-units preferably have an overall printed area of less than 0.5 mm$^2$, with a byte-unit module size of the order of 0.1 mm×0.1 mm to 0.175 mm×0.175 mm.

Advantageously, the byte-units are dispersed over the area of a printed text and used as replacement for i-dots, dots in punctuation marks (".", "?", "!", ":", ";") and/or, depending on the language used, other dots used as diacritical mark, such as the trema (diaeresis) or German umlaut ("").

In this context, the system can in particular allow encoding of a larger encoded data stream. To this end, an encoded data stream is formed by a plurality of byte-units that are dispersed over the area of the printed text, over one or several pages depending on the character length of the relevant data stream to be encoded and the capacity of the relevant printed text to carry data.

Each single alphanumeric character of the encoded data stream can advantageously be mapped to a corresponding one of the byte-units, the alphanumeric characters being preferably encoded in ASCII-code, which can be suitably encoded by means of the relevant byte of data carried by the data block of any given byte-unit.

In the context of a preferred variant, identical byte-units are encoded multiple times in the printed document to achieve redundancy. In this particular context, maximum redundancy can be achieved, for a given encoded data stream having a character length L and a given printed text having a data carrying capacity C, when n=k+1 identical byte-units are printed for each character of the encoded data stream, k being an integer computed with the following formula:

$$k = [C/L] - 1.$$

In the context of the present invention, each byte-unit advantageously consists of 4×4 one-bit modules, with the finder pattern preferably consisting of seven black modules forming two solid lines at one corner of the byte-unit.

In accordance with a preferred embodiment of the system, the parity bit is encoded in an inner area of each byte-unit. The parity bit can conveniently be set to the following value:

$$p = |(\Sigma_{i=1}^{8} d_i) \bmod 2 - 1|$$

where $d_i$ (i={1, 2, ..., 8}; $d_i$={0, 1}) are single data bits of the relevant byte of data carried by the byte-unit, which allows simple checksum computation for the purpose of rejecting incorrectly detected byte-units.

The byte-units of the invention can be printed with off-the-shelf office printers, in particular commercially-available office printers, such as laser printers, which can print at a printing resolution of the order of 1200 dpi.

Also claimed is the use of the aforementioned system to code, authenticate and detect copying of documents produced or processed by office printers and scanners.

1.2 BRIEF DESCRIPTION OF THE DRAWINGS

The present specification makes reference to the following Figures which are attached hereto:

Figure 3:
Figure 4:
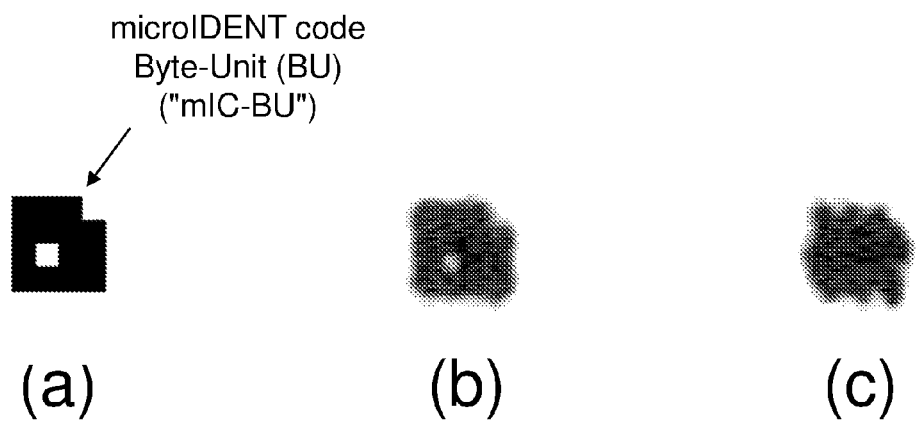
Figure 5:
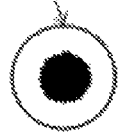
Figure 5:
Figure 6:
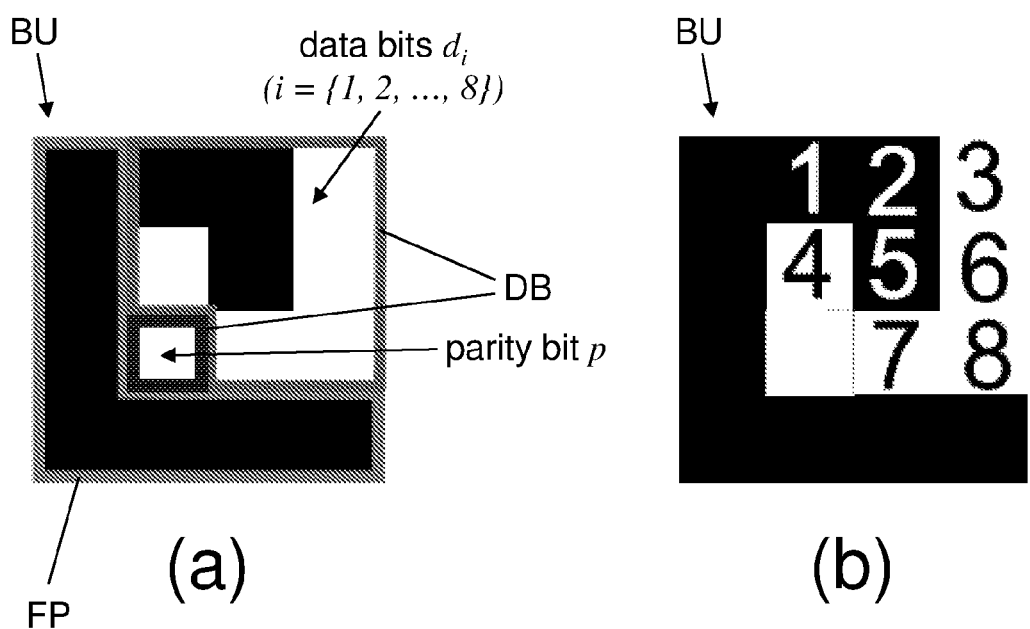
Figure 7:
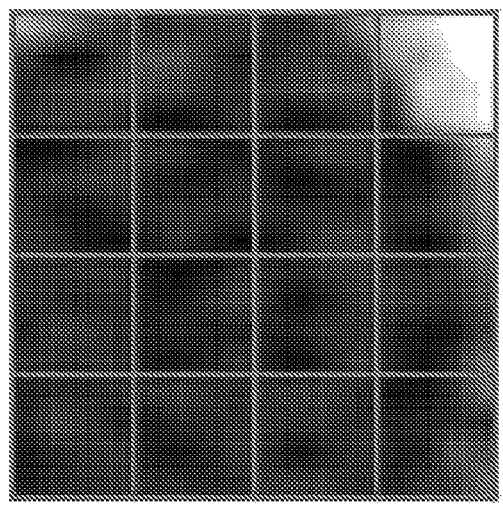
Figure 8:
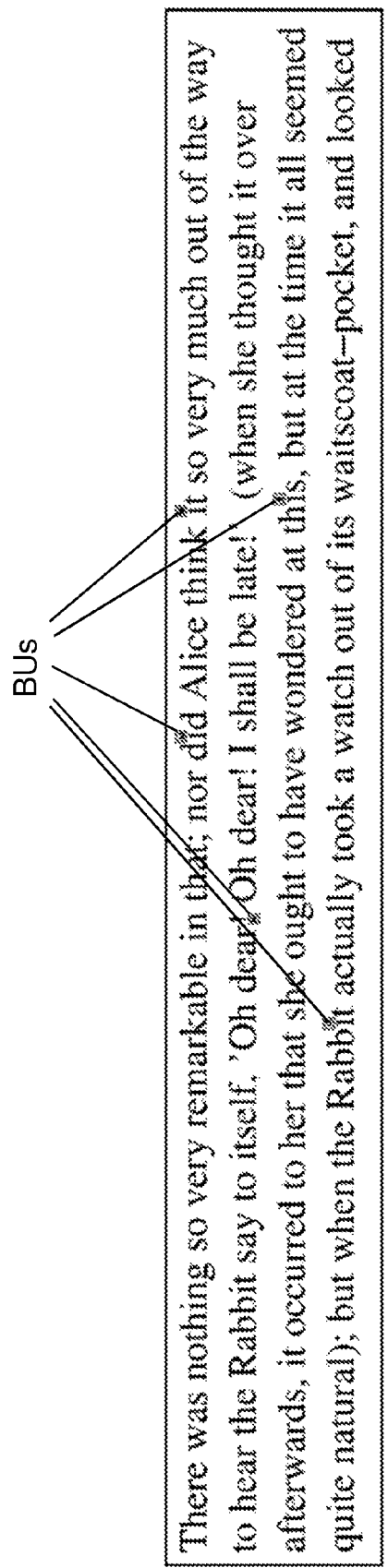
Figure 9:
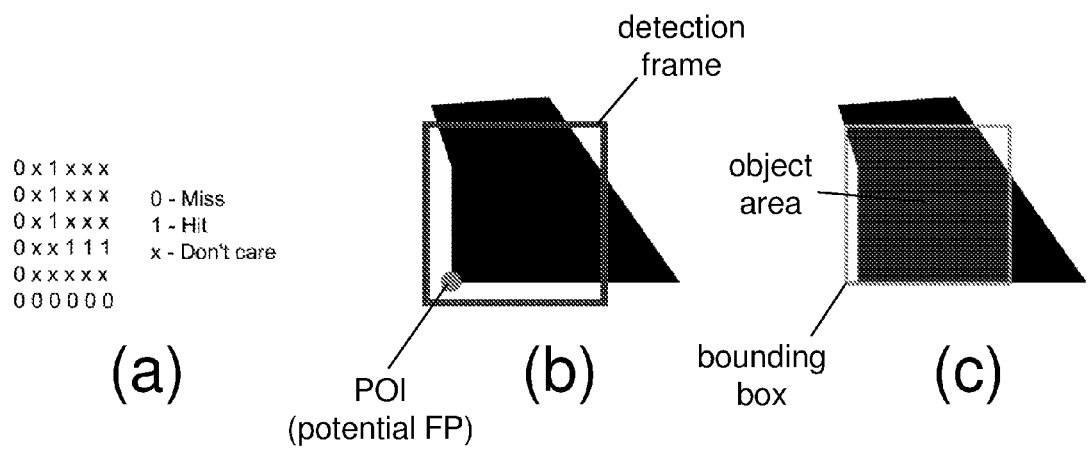
Figure 10:
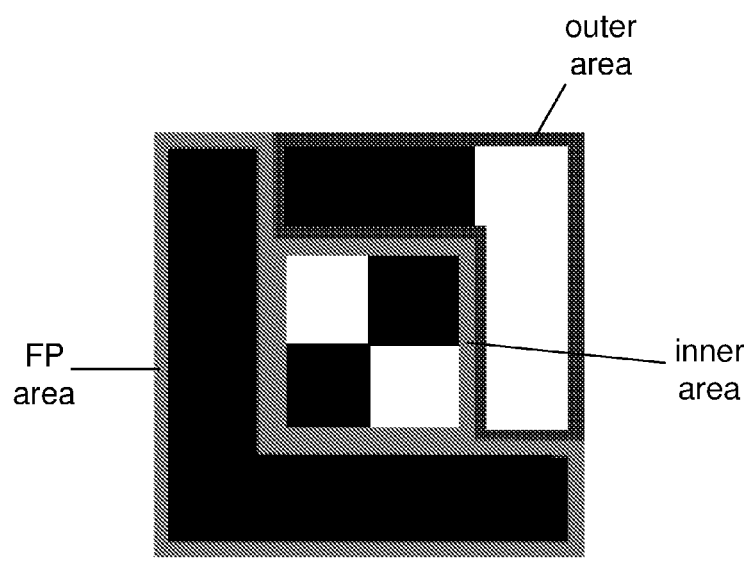
Figure 11:
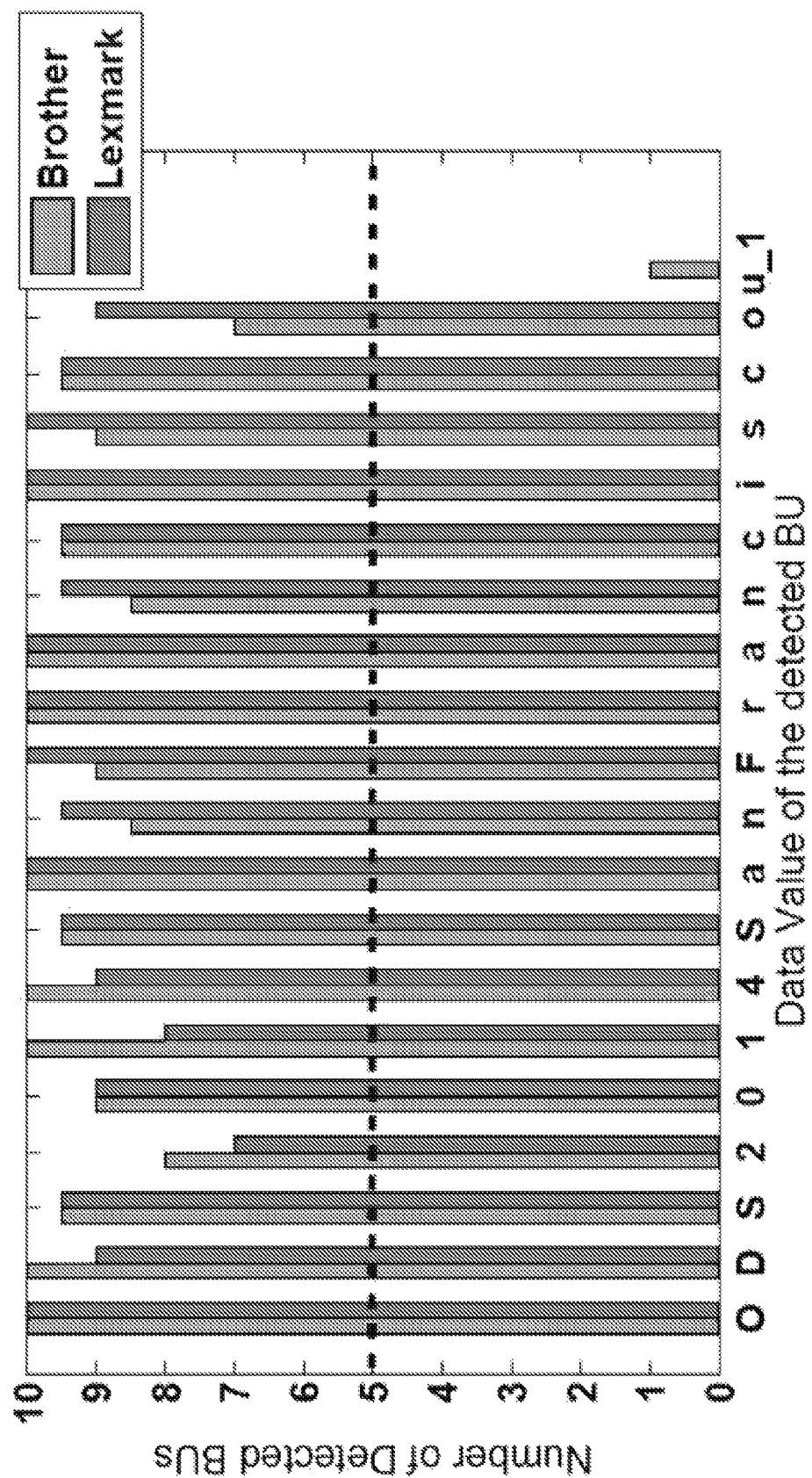
Figure 12:
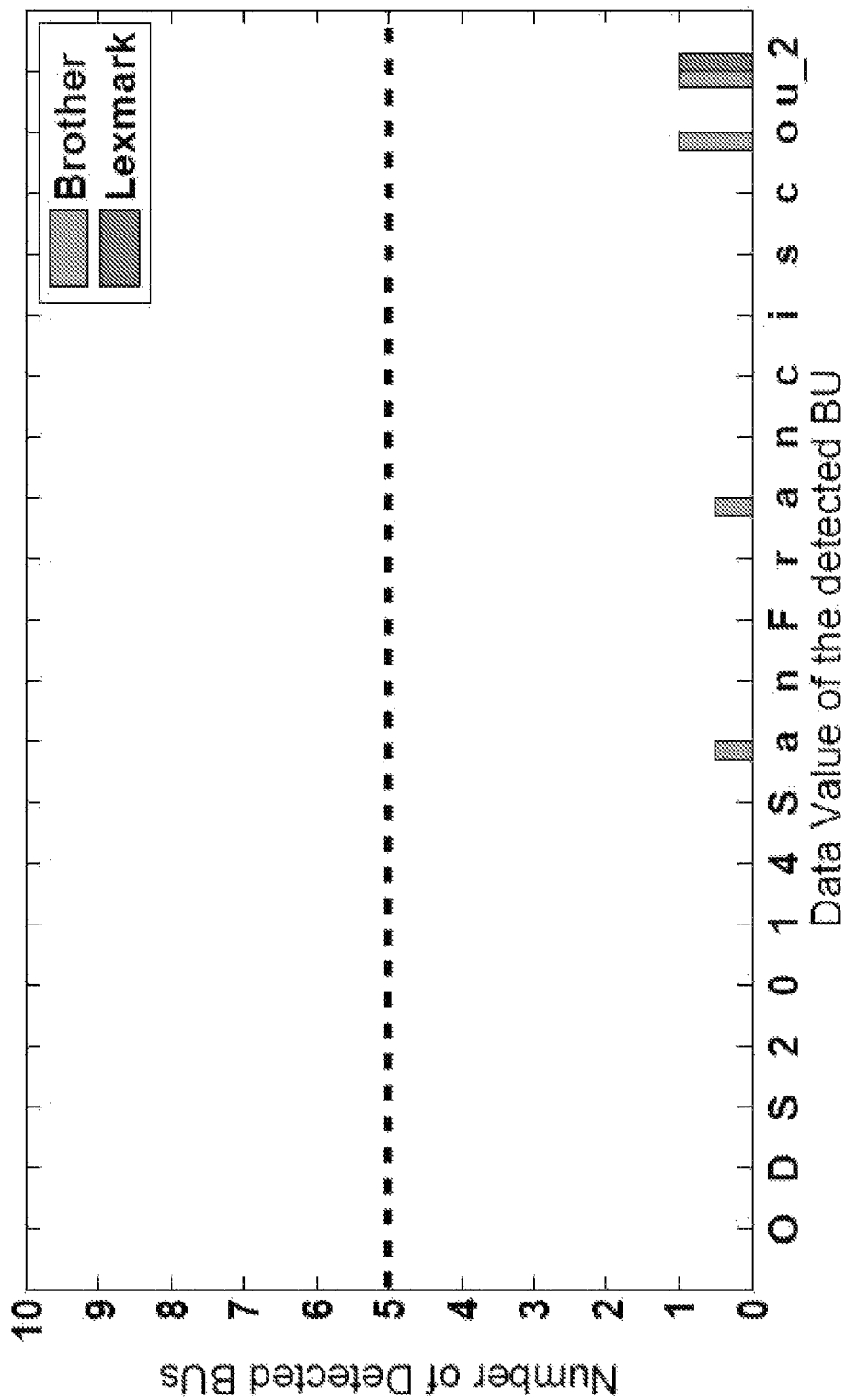

FIG. 3(a)-(b) is an illustration of (a) a Data Matrix code (see e.g. http://en.wikipedia.org/wiki/Data_matrix_(computer)), which can again be generated with the help of Terry Burton's toolbox (http://www.terryburton.co.uk/barcodewriter), and of (b) a microIDENT code;

FIG. 4(a)-(c) illustrates a Byte Unit (BU) of a microIDENT code in (a) an original state, (b) a printed state, and (c) a copied state;

FIG. 5 illustrates an example of a microIDENT-code application where Byte-Units (BU) are used as i-dots;

FIG. 6(a)-(b) is an overview of the design methodology of a microIDENT code Byte-Unit (BU), or mIC-BU;

FIG. 7 illustrates a case of a possible miss detection averted with the help of a parity bit;

FIG. 8 is an excerpt of an encoded document where mIC-BUs, marked in red, are dispersed in a text;

FIG. 9(a)-(c) illustrates (a) a hit-or-miss operator used for detection, (b) an example of a detection area and (c) bounding box and calculated area for this example;

FIG. 10 is an overview over the different readout areas: FP area (in red), outer area (in blue) and inner area (in green);

FIG. 11 illustrates the number of detected BUs for each alphanumeric character of an illustrative printed document encoded with the text "ODS2014SanFrancisco";

FIG. 12 illustrates the number of detected BUs for each alphanumeric character in a copy of the printed document; and FIG. 13 is an example of a proposed positional coding.

2. RELATED WORK

Figure 1:
FIG. 1 is an illustration of a known EAN13 barcode (see e.g. http://en.wikipedia.org/wiki/EAN13), which can for instance be generated with the help of Terry Burton's toolbox (http://www.terryburton.co.uk/barcodewriter)

The origin of 2D-codes is based on so called barcodes. Barcodes are machine readable codes which are composed out of bars (lines). One example of such a coding (namely a so-called EAN13 barcode, which can be generated with the help of Terry Burton's toolbox, http://www.terryburton.co.uk/barcodewriter) is given in FIG. 1. EAN stands for "European Article Number", but is now known as "International Article Number" even though the EAN acronym has been retained (see also http://en.wikipedia.org/wiki/EAN13). An EAN13 barcode is a 13-digit (12 data and 1 check digits) barcoding standard which is widely used in a wide range of applications (e.g. retail and logistics).

2.1 2D-Codes

Most of the research literature focuses on 2D-codes for mobile devices. This is due to the fact that nowadays mobile phones and smartphones are omnipresent (cf. [Ericsson2013]). 2D-code acquisition applications are performed in environments which are not necessary stable. In contrast to the use of 2D-codes in a mobile environment it is possible to control different environmental factors in other applications, such as document authentication or factory automation (e.g. for detection of workpieces). For example one of the most important factors for high quality readout of 2D-codes is illumination. Illumination can be unstable in a mobile applications (cf. [Tan2012]), whereas illumination is assumed to be stable in document authentication application in an office environment.

It is also possible to use ink for the 2D-codes which is only visible under a certain illumination, allowing to print multiple 2D-codes on top of each other. The use of an ink which reacts with the environment is also possible, like thermo-chromic ink (cf. [Peiris2011]). An additional factor is the constant motion of the camera in a mobile context which entails suboptimal image processing conditions. Those aspects generate mobile 2D-codes which have a relative low data density. Most colour based mobile 2D-codes only use up to four different colours (cf. [Tan2012]).

2.2 2D-Code Design Elements

Figure 2A:
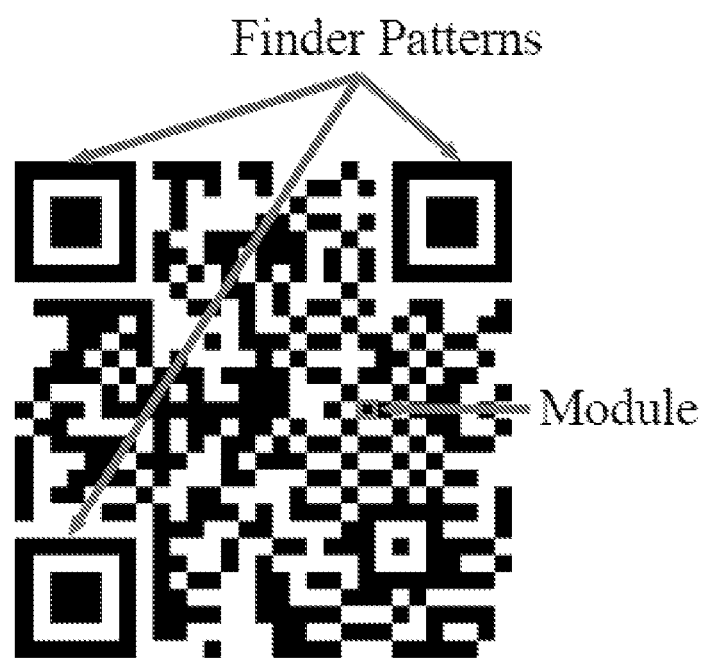
FIG. 2(a) is a typical example of a known Quick Response Code, or QR Code (http://en.wikipedia.org/wiki/QR_code), which can likewise be generated with the help of Terry Burton's toolbox (http://www.terryburton.co.uk/barcodewriter)

When designing a visual code which is to be recorded and processed with the help of a camera and a computer, multiple considerations have to be taken into account. While most of these considerations tend to be similar for all visual codes, some of them are dependent on the specific requirements of the code in question. Each 2D-code is constructed by a number of modules. Each module carries one bit of information. These modules are combined to form a code symbol. Many 2D-codes use quadratically formed modules, like the widespread "Quick Response Code" or "QR code" (http://en.wikipedia.org/wiki/QR_code). A typical QR code is shown in FIG. 2(a), where one module is marked by a red frame. Other examples of module forms, as discussed for instance in [Kato2010], include triangular modules ("High Capacity Color Barcode"), dot modules arranged in a hexagonal grid ("MaxiCode") and modules consisting of circular segments ("ShotCode"). Some 2D-codes use multiple colours to enhance the data capacity. One example is again the High Capacity Colour Barcode. Each 2D-code symbol is surrounded by a quiet zone (without any modules). The quiet zone is used as a separator between the 2D-code symbol and other objects in the surrounding area.

One challenge in 2D-code design resides in the fact that some design requirements are contradictory to others. For example, optimization for faster reading speed will result in smaller data capacity, assuming that the used reading hardware and the surface area of the 2D-code are identical. Examples for optimization requirements are usability, reading speed, production and operating costs, reliability and safety, security, and data capacity of 2D-codes.

Figure 2B:
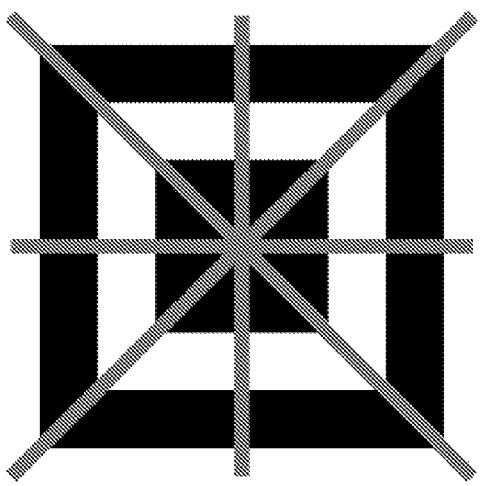
FIG. 2(b) is an enlarged view of one of the Finder Patterns (FP) contained in the QR Code of FIG. 2(a)

It is not always clear where inside an image a 2D-code is located, or if there exists a coded area inside the image. Therefore, 2D-codes typically use special patterns, or "Finder Patterns" (FP), to allow localisation of the 2D-code. For easy and fast detection of 2D-codes, these Finder Patterns differ from the rest of the 2D-code. Additionally, a FP is typically used to derive the 2D-code orientation. This fact explains why FP should be detectable independently from the 2D-code's orientation. FP should also allow the detection of some distortions of 2D-codes. Furthermore, FP can be used to derive the size of 2D-code modules. One example of FPs is shown in FIG. 2(a), which shows three such FPs. FPs have a specific pattern which cannot be detected inside other areas of the 2D-code. Random parts of the image which are similar to one FP can be filtered by using multiple FPs. Additionally, the three shown FPs are oriented at 90° one with respect to the other, thereby enabling a derivation of the 2D-code orientation. A FP is also detectable from all orientations because the pattern always has the same black to white ratio, independently of the orientation (cf. FIG. 2(b)).

3. APPROACH

Document coding in the context of counterfeit deterrence is a well-established topic which is mainly based on optical approaches (see e.g. [Hill2009]). However, there is a need for easy-to-generate and easy-to-detect mechanisms for document protection signets which are found on clearance papers, certificates, and especially office documents printed on off-the-shelf printers (see e.g. [Iqbal2006]). Furthermore, the data density of a printed information signet should be dense and robust [Herrigel2008]. Therefore, a copied original document should be detected as copied.

The concept of the microIDENT code (mIC) is based on local tiny coded signets (or "code symbols") which are scattered across a printed text. Moreover, the microIDENT code can be hidden in a standard text by a simple modification of parts of the letters. This modification is usually not visible to the naked eye. By copying a document, the signets are partly degraded and a content-readout is not possible. Interesting enough, results show that the data density depends on the written language used. Widespread 2D-codes such as QR-code are designed to be used in mobile applications. When the environment is controllable, as it is the case for presently contemplated applications, it is possible to set constraints for the processing of the 2D-code:

Orientation of the 2D-code symbol is known, or at least limited to a certain number of possible states (e.g. in 90° angles), The size of the 2D-code symbol is known and stable, The 2D-code is printed on a flat surface and aligned properly with the image capturing device. Only small distortions are to be assumed, The environmental conditions are stable.

3.1 General Case

If all above mentioned conditions are fulfilled, it is possible to reduce the amount of modules which carry no data. This is how one proceeds with the microIDENT-code (cf. FIG. 3(b)), a simplified version of the Data Matrix code (see e.g. http://en.wikipedia.org/wiki/Data_matrix_(computer)) which is illustrated in FIG. 3(a). Data Matrix FPs are not as large as QR code FPs because only the outer line of the 2D-code symbol is used. Two sides of the symbol are solid, while the other sides are dotted. If the stored data are larger than a specified amount, multiple Data Matrix blocks are combined in one symbol (cf. FIG. 3(a) where one block is marked by a red rectangle). The microIDENT code only uses the two solid lines of Data Matrix and only one data block, instead of multiple data blocks like in the case of the Data Matrix.

An even more simplified version is possible, if only one side of the FP is used and the rest is used as a data area. The microIDENT code is developed to be used for document authentication. It is printed in an environment of similar sized noise ("noise" being interpreted in this particular context as disruptions in the printing). Because of these conditions the simplified FP was estimated to be not adequate enough to differentiate between the noise and the microIDENT-code symbol. To detect FPs it is important to introduce a white quiet zone around a mIC-symbol. In addition to the data modules and finder pattern, most 2D-codes are equipped with an error-correction coding (ECC) (cf. [Reed1960]). Usually the payload of such standard 2D-codes is up to approx. 85% without ECC and FP, depending on the size of the data modules and the used code. microIDENT is able to achieve approx. 99% payload under the previously given constraints (cf. [Ehlenbröker2012]).

3.2 Application Case

The microIDENT code can be fragmented in elementary ("atomic") units, so called Byte-Units (BU), which consist of a single data block (DB) carrying one byte payload plus one parity bit for simple error detection. An example of a BU is given in FIG. 4(a). BUs exhibit notches and pinholes. Those notches and pinholes are used for the detection of copied data, because they are blurred in the printing and copying process (see FIG. 4(b) and FIG. 4(c)). BUs can in particular be applied to written fonts as, e.g., i-dots (cf. FIG. 5) or dots in punctuation marks. An A4-format page can contain hundreds of such BUs which can be used for text coding, authentication, and/or copy detection, the overall size of each BU being in that respect of less than 0.5 mm².

3.2.1 Advantages and Limitations

First and foremost BUs are a low cost way to add security to printed documents. The BUs are interesting especially because there is no need for special hardware. Instead, microIDENT can be applied to laser printers and scanners which are found in many offices. As the BUs are used instead of i-dots in the aforementioned application example of FIG. 5, there are only small disruptions for a human reader. The coding is often overlooked by the viewer or it is interpreted as a normal distortion which occurs during the print-and-scan-process. Therefore, it provides a form of data hiding as a side effect. One limitation is the amount of storable data, because it is predefined by the character content (e.g. i-dots) of a document. Because of this limitation, one could use BUs as carrier of one string, e. g. a serial number. Another field of application can be the usage as an addendum to a cryptographic system: A string is encoded in the BUs which is subsequently used as a cryptographic key to decrypt data. This would add an additional security layer. BUs are susceptible to disruptions in the printing and scanning process due to a missing complex error correction. This is called flaw-by-design because this "flaw" is used to make copying attacks difficult.

3.2.2 Byte-Unit Details

The expression "Byte-Unit" is used because each mIC-BU carries one byte of data. In addition it carries one parity bit. Another example of a BU is illustrated in detail in FIG. 6(a). The red border area (at one corner of the BU) is defined as a FP. Other areas are the data area (green border) and the parity bit (blue border)—which jointly form a data block (DB) of 3×3 modules. The data is encoded in the modules as one bit per module. A black module equals a value of 1 and a white module equals a value of 0. The modules are scanned in increasing order displayed in FIG. 6(b). This numeration is also used as an index for the single data bits $d_i$, where i={1, 2, ..., 8} and $d_i$={0, 1}. Parity bit p is set to the following value:

$$p = |(\Sigma_{i=1}^{8} d_i) \bmod 2 - 1| \qquad (1)$$

FIG. 6(b) shows an example for this encoding pattern: $d_1$, $d_2$ and $d_5$ are black modules (i.e. their value is 1). Therefore, the result of Equation (1) defined above is p=0 and the parity bit module is set to white. An avoided miss-detection is shown in FIG. 7. In this case, $d_3$ is detected as 0 while all other data bits are detected as 1, that is p=0 (white parity bit). It can be observed in FIG. 7 that this is not the case. As a result, this object is discarded.

3.2.3 Atomic Dispersion

One single BU, as described in section 3.2.2, cannot store enough information for most use cases. Instead they are used as atomic parts of a larger encoded data stream. One approach which is proposed in this specification is the following:

Proposition. The Byte-Units which form the complete data stream are dispersed over all areas of a text. They are used e.g. as a replacement for i-dots, dots in punctuation marks and, depending on the language used, other dots used as diacritical mark (for instance German "umlauts"). For different languages the data carrying abilities are different because the occurrence of dots is different in each language. To show the different encoding capabilities per language, language statistics have been computed empirically, as displayed in Table 1. These results show that the approach to encode BUs into a document is promising because the data carrying capacity is higher than the use of single BUs, independently of the language used. Moreover, the coding does not disturb a printed document as larger 2D-codes would do. Due to this encoding approach the complete document is used as encoding area instead of a predefined smaller area. An example for this approach is given in FIG. 8 which shows an excerpt of "*Alice's Adventures in Wonderland*" by Lewis Carroll. The introduced BUs are scanned from top-to-bottom and, in the case of BUs with the same vertical position, from left to right. This approach of a positional readout without an additional synchronisation is appropriate only because the processing environment is stable.

TABLE 1

Storage capacity of a one-page document in various languages, in case all dots inside the document are replaced with mIC-BUs

| | Average relative amount of text with characters or punctuation marks with dots (empirical data) | Capacity of one A4-page (2500 characters) document in bytes |
|---|---|---|
| German | 9.2% | 261.7 |
| French | 7.3% | 183.8 |
| English | 6.5% | 163.8 |
| Spanish | 5.3% | 135.1 |

3.2.4 Detection and Decoding

Multiple steps are used to enhance the detection and decoding rate. The following steps are mainly aimed at reducing false positive detections (e.g. the detection of a normal i-dot as BU). Detection and decoding are carried out on the basis of a scanned 8-bit grey value image. All thresholds and the hit-or-miss operator (cf. [Dougherty2003], Chapter 4, "*Hit-or-Miss Transform*", pp. 79 ff.) used in this process are created heuristically. The hit-or-miss operator is a morphological operator which is used for binary image object detection. The detection and decoding of the BUs can be divided into the following parts:

Detection of possible finder patterns by hit-or-miss operator. Here, a grey value image is converted into a binary black-and-white image with the help of a fixed threshold $T_{bin}$. The hit-or-miss-operator (cf. FIG. 9(a)) is used to detect potential FPs, shown by a red dot in FIG. 9(b). In the text, the points detected during this operation are called points-of-interest (POI). Detected POIs which are very close to each other are—except one—discarded.

Possible BUs detection. Because previously detected POIs represent possible left bottom edges of a BU (the FP of the BU), they are used as an origin to span a detection area (or "detection frame") of a predefined size. A detection frame is an area, where a BU is possibly located and where a more precise examination is promising. The size of the detection frame is oriented towards the size of a BU, which is known due to the print size and scanner resolution. Considering possible distortions and noise, the detection frame is set larger than the size of a BU (cf. FIG. 9(b) where the detection frame is highlighted in blue). An object is a connected area of black pixels. For each object inside the detection frame, its area and a rectangular bounding box are computed. Therefore, the object area is the number of black pixels which form an object (marked blue in FIG. 9(c)). The bounding box represents the smallest possible rectangular frame around the detected object (marked green in FIG. 9(c)). The frame's size is used as a measure to detect possible incorrect BUs: As a perfect BU is surrounded by a white quiet zone, it does not change its area size if the detection frame is enlarged. Contrary to this fact, most other detected objects change their area size if the detection frame is enlarged. An example for this effect is observed in FIG. 9(b) and FIG. 9(c). The readout of the detected possible BUs is started with the previously generated bounding boxes. It is performed inside the area which is defined by the bounding boxes and is based on the original grey value image. The following steps are performed during the BU readout:

Accurate localization of BUs. This step is to ignore the distortions at the boundary of a possible BU. These distortions are inevitable due to the noise which occurs in the print-and-scan-channel.

Copy detection by noise detector. The noise detector checks if an increased degree of noise occurs at the edges of FPs. The left side of a FP consists of one vertical edge and no horizontal edge in an ideal case. For the bottom side of a FP, one horizontal edge and no vertical edge exists in an ideal case. As the print-and-scan-process introduces noise into the BUs, this noise is detected by determining the number of BU's edges. For the left and bottom side the number of edges are a given. Therefore, those parts of a FP are used to detect noise via an edge-detector. A Sobel-operator (cf. [Burger2009], pp. 135 ff.) with a threshold $T_{Sobel}=25$ was used to produce two edge images (vertical and horizontal edges). The threshold is necessary for conversion of the Sobel gradient image into a binary edge image. The binary edge image is utilized for edge pixel counting. The number of detected horizontal and vertical edges is summed up to $n_{edge}$ and is used to determine the enhanced noise level of a copied version of a BU: The evaluated object is discarded if $n_{edge}$ is larger than a specified value $T_{noise}$.

Sub-area definition. Modules are defined by 4×4 pixel clusters (i.e. a total of sixteen modules per BU). An example of such a division is shown in FIG. 7.

Module Readout. Each module is read out with the help of grey value image thresholding. This thresholding is determined by evaluating the mean grey value of each module:

$$q_j = \begin{cases} 1, \overline{M}_j < T_{roj} \\ 0, \overline{M}_j \geq T_{roj} \end{cases} \text{ for } j = 1, 2, \ldots, 16 \quad (2)$$

Equation (2) denotes all grey values which belong to the module $M_j$. Consequently, $\overline{M}_j$ denotes the (arithmetic) mean grey value of the evaluated module. The threshold $T_{ro}$ is adapted to the module's position, which is FP, outer area or inner area (cf. FIG. 10). The threshold value $T_{roj}$ in the FP is set to a lower value, compared to the inner and outer area thresholds: A correct FP module $\overline{M}_j$ must always have a low signal value (black). In addition $T_{roj}$ is adapted according to the mean grey values $\overline{M}_{nbj}$ of neighbouring modules:

$$T_{roj} = \begin{cases} T_{posj}, & \text{if all } \overline{M}_{nbj} \leq T_{nb} \\ T_{posj} + t_{nb}, & \text{if any } \overline{M}_{nbj} > T_{nb} \end{cases} \text{ for } j = 1, 2, \ldots, 16 \quad (3)$$

In Equation (3) the parameter $T_{posj}$ denotes the module's position-adapted threshold and $T_{nb}$ the threshold of the neighbouring modules. Up to 4 different mean grey values of neighbouring modules (left, right, top and bottom) are denoted with $\overline{M}_{nbj}$. $T_{roj}$ is adapted by $t_{nb}$ if any of the neighbouring modules have a mean grey value $\overline{M}_{nbj}$ higher than $T_{nb}$. After computation of Equation (2) 16 binary values are computed for each evaluated BU. The technique proposed here is interpreted as a binarisation because it maps an 8-bit grey value image to binary values. The approach described here differs from the approach described in [Ehlenbröker2012] where only binary images where used instead of 8-bit grey value images. In comparison to the previous approach the presently-proposed approach generates considerably better results.

FP existence. The existence of FP is checked by the previously computed q-values which belong to an FP. If one or more FP-modules correspond to q-values which are 0, then the entire BU is discarded.

Checksum computation. The checksum (parity bit) is computed for each detected possible BU. BUs with an incorrect checksum are deleted (cf. Equation (1)).

4. RESULTS

This section is divided into two parts. In the first part (section 4.1), Text Data Encoding is described, while in the second more application-oriented part (section 4.2), Redundant Copy Detection is being addressed.

4.1 Text Data Coding

BUs are encoded in a text to test the encoding capability and the robustness for document coding applications. A one-page excerpt of "*Alice's Adventures in Wonderland*" by Lewis Carroll is encoded by the use of mIC-BUs. The applied font is PostScript Times Roman with a font size of 12 pt. Exactly two-hundred dots are inside the single page of text used for the tests. Most of the dots are i-dots, while all others are found in punctuation marks (. ? ! : ;). A module of a BU is printed in the size (or "byte-unit module size") of 0.127 mm×0.127 mm (0.005 inch×0.005 inch). The 4×4-modules of one BU have a size of 0.508 mm×0.508 mm (0.02 inch×0.02 inch) or, in other words, an overall printed area of the order of 0.26 mm².

Fifty randomly chosen dots are replaced with BUs on each page. In addition, the data saved inside the BUs is also generated randomly. Overall ten pages with a total of five hundred BUs are generated. Those ten pages are printed with two laser printers (Lexmark C736dn and Brother DCP-8065DN) at a printing resolution of 1200 dpi. Both printers are set to black-and-white printing for this test. The Brother DCP-8065DN was also used as a scanner to acquire 8-bit grey-value images with the scanning resolution set to 1200 dpi. The computation time is in between approx. 11 and 17 seconds per page. These computation times were achieved in Matlab with paralleled but not optimised code on an Intel I7-2600k processor. These computation times relate to the run-time of the algorithm, without printing or scanning. A noticeable difference occurs in the computation time between the original printouts (mean computation time: 12.19 seconds) and the copies (mean computation time: 15.69 seconds). The amount of BUs stays the same. Results for individual pages are shown in Table 2 for the printout and in Table 3 for the copy. Table 2 has two result columns for each researched printer. The column labelled with "Correct" summarizes correctly detected BUs. The "Incorrect" column denotes all BUs which are incorrectly detected. This includes i-dots which are detected as BUs, or original BUs which are read out with errors. Defective BUs may be detected as valid if the checksum is valid. This occurs if two bits of the BU are flipped. The percentage values in the "Combined" rows of the tables are based on the overall five hundred BUs which are printed by both printers. No differentiation between "Correct" and "Incorrect" is displayed for the copy (Table 3) because ideally there should be no BUs detected after a copy. Therefore, all detected BUs should be "Incorrect" ones.

TABLE 2 microIDENT Text Data Coding - Detected BUs - Printout

| Page | Brother DCP-8065DN Correct BU | Brother DCP-8065DN Incorrect BU | Lexmark C736dn Correct BU | Lexmark C736dn Incorrect BU |
|---|---|---|---|---|
| 1 | 45 | 1 | 46 | 0 |
| 2 | 43 | 1 | 45 | 0 |
| 3 | 44 | 0 | 47 | 0 |
| 4 | 45 | 2 | 44 | 0 |
| 5 | 41 | 3 | 43 | 0 |
| 6 | 46 | 1 | 43 | 0 |
| 7 | 45 | 0 | 41 | 0 |
| 8 | 47 | 0 | 44 | 0 |
| 9 | 46 | 1 | 42 | 0 |
| 10 | 49 | 0 | 45 | 0 |
| Combined | 451 (90.2%) | 9 | 440 (88%) | 0 |

TABLE 3 microIDENT Text Data Coding - Detected BUs - Copy

| Page | Brother DCP-8065DN | Lexmark C736dn |
|---|---|---|
| 1 | 3 | 0 |
| 2 | 0 | 0 |
| 3 | 0 | 0 |
| 4 | 0 | 0 |
| 5 | 3 | 0 |
| 6 | 2 | 0 |
| 7 | 0 | 0 |
| 8 | 3 | 0 |
| 9 | 3 | 0 |
| 10 | 4 | 0 |
| Combined | 18 | 0 |

It is observed in Table 2 that the detection rate of the printout is approximately 90%. In contrast, nearly no or absolutely no detected BUs occur for the copy of the printout (Table 3). These results clearly show that mIC-BUs are a valid approach for document security and copy detection. Further enhancement is reached by a redundant coding approach, described in the following section.

4.2 Redundant Copy Detection

A different approach of using mIC-BUs is redundant coding for copy detection. Instead of maximising the data content, redundancy is integrated in the printed data. Identical BUs are encoded multiple times in one document to achieve redundancy. Two constraints must be considered when computing the possible redundancy: The data carrying capacity (C) which a document offers and the length (L) of the data string which has to be encoded, the expression "data string" designating in this context the data which is encoded in a document. The parameter C is given by the numbers of dots in a document, which is equal to the number of encoded BUs. The parameter L is identical to the number of alphanumeric characters used in the data string. A single alphanumeric character is encoded in 7-bit ASCII-code and mapped to one BU. Therefore, the length L can be expressed in BUs. The maximum possible amount of redundant BUs which is added is:

$$k = \lfloor C/L \rfloor - 1 \quad (4)$$

under the constraint of L≤C. To achieve maximum redundancy, n=k+1 BUs with identical data must be printed per encoded alphanumeric character. When combined, those n BUs form a code word. A "code word" is a single element of code. The code word is built of multiple symbols. For instance, binary code words are built of 0 and 1. Binary code words with a length of e.g. three symbols accordingly have the following structure: 010, 111, 001, etc. It is possible to compute the Hamming distance (cf. [Hamming1950]) for the code words which in turn are used for the classification of the code words after readout. In general, the Hamming distance between two code words $x=(x_0, x_1, \ldots, x_t)^T$ and $y=(y_0, y_1, \ldots, y_t)^T$ ($x \neq y$) is defined as:

$$\Delta(x,y) = \sum_{i=1}^{t} d_H(x_i, y_i) \quad (5)$$

where $d_H(x_i, y_i)$ is:

$$d_H(x_i, y_i) = \begin{cases} 0, & x_i = y_i \\ 1, & x_i \neq y_i \end{cases} \quad (6)$$

and t is the length of both code words. The parameter $\Delta(x, y)$ denotes the number of digits of code word x that must be changed so that it is read (classified) as code word y. The redundancy coding proposed in this section generates a Hamming distance of n/2: If n BUs originally belong to one character n/2 BUs must change to interpret a BUs which belongs to another character. This estimate is conservative because it is unlikely that n/2 BUs belonging to one character change exactly to a BU of another character in a real world scenario. It is more likely that distortions lead to BUs which belong to multiple different characters or that some BUs of one character are simply not detectable. The classification decision is executed with Hamming distance: To detect a character one needs more than n/2 detected BUs that belong to a certain character (after the print-and-scan process). In addition one defines:

$$a = b/s \quad (7)$$

where b is the number of detected BUs for a character and s is the number of times this character is encoded in the data stream. The variable a is the number of BUs which is used for the classification decision. This step is added, because identical characters can occur multiple times in a data stream.

In this particular example, the text "ODS2014SanFrancisco" is encoded into a one-page document. The number of dots inside the used page allows for the encoding of exactly C=200 BUs. As the encoded text "ODS2014SanFrancisco" includes L=19 characters, one uses a redundancy of k=9 (by applying Equation (4) above) and therefore, ten BUs per encoded character (n=k+1=10). This in turn results in hundred and ninety (190) encoded BUs in total. The bit values used for the encoding of a single BU are the binary ASCII values of the corresponding character (e.g. "D"—0100 0100). Used printers and scanner and the settings are identical to the ones in section 4.1. It is obvious that the Hamming distance is n/2=5. The results are shown in FIG. 11 for the printout and in FIG. 12 for the copy.

Both figures show the number of detected BUs for each code word. For some code words the number of detected BUs is not an integer, which can occur, if multiple occurrences of one code word are detected (as previously stated). The code words "u_1" (cf. FIG. 11) and "u_2" (cf. FIG. 12) mark unknown (not originally encoded), though detected BUs.

The results for the printout (cf. FIG. 11) show that the encoded text is readable for both printouts. In fact the results for all code words have a high distance to the decision boundary of n/2=5 detected BUs, with only two out of the nineteen results going as low as 7 detected BUs. In addition, only one BUs (u_1) is incorrectly detected. The results for the copy (cf. FIG. 12) show that nearly no BUs are detected. Interestingly, both of the detected BUs for "u_2" had the identical data value (0000 0000). In summary, these results show that mIC-BUs are very well suited for the usage in the area of document security copy detection.

4.2.1 Positional Coding

One way to distinguish between single characters is the use of positional coding instead of using the estimation technique proposed in section 4.2. Therefore, an additional layer of information is proposed which is embedded in the individual positions of Byte-Units: The entire coding area is divided into multiple smaller coding sub-areas, where the number of mIC-BU in each sub-area is used as a second information layer. One example of positional coding is shown in FIG. 13.

EXAMPLE

The coding area is divided into 6 sub-areas (cf. FIG. 13), marked by the red lines. BUs are marked by black dots and the amount of BUs in each coding sub-area is shown in the bottom right of each sub-area. BUs are scanned according to their position. The scanning direction goes from top to bottom, denoted in FIG. 13. If multiple BUs exists on an identical y-level the scanning order for these BUs changes to x-direction (left to right). The position difference between the first BU (upper left) and the next BU at the nearest, though not identical y-level, holds the information of used sub-areas. This information is encoded in the distance difference in the x- and the y-dimension. Subsequently, the difference in the dimension of the longer distance is divided by the distance in the shorter dimension. In FIG. 13 this number is six, because the longer y-dimension distance is about six times the length of the shorter distance, so that the number of coding sub areas is also 6.

Positional coding represents a meta information layer that can be used as an additional security feature.

5. CONCLUSIONS

In this specification one proposes a new coding technique for document security applications. The proposed microI-DENT-coding (or "mIC") is based on basic modules of standard 2D-codes. The proposed mIC does not make use of some of the features of a standard 2D-code such as a large FP and error correction coding, thereby enhancing data density. This approach enables the printout of tiny code symbols, the so called Byte-Units (BU). Due to the small printing size it is feasible to embed BUs in text documents replacing e.g. i-dots and other dots in a document. This results in a hidden coding which is usable with standard office equipment. It has successfully been demonstrated that this hidden coding is equipped with a self-destruction feature if copied. The self-destruction is a consequence of small disruptions (noise) which any copy brings to the original BU-code layout. In addition one achieves a high readout rate for the original printout.

One drawback in the proposed Text Data Coding is the loss of data in the original printout. As stated above the readout rates are high, but for some application this readout rate might not be enough. This problem can be solved thanks to the proposed redundancy-based coding: Here multiple redundant BUs are encoded for one character. This approach reduces the possible storable data volume. However, one achieves in exchange a higher detection rate for the encoded characters. In tests the achieved detection rate was 100%. Another benefit of this approach is the enhanced distance between a copy and an original printout. In conclusion the redundancy based coding is a very useful approach to enhance the copy detection of documents and can be used for security printing applications.

REFERENCES

[Kamijo2008]
Kamijo, K., Kamijo, N., and Gang, Z., "*Invisible Barcode With Optimized Error Correction*", International Conference on Image Processing (ICIP) 2008, 15th IEEE International Conference, pp. 2036-2039, Oct. 12-15, 2008

[Ericsson2013]
"*Ericsson Mobility Report*", June 2013 (http://www.ericsson.com/res/docs/2013/ericsson-mobility-report-june-2013.pdf)

[Tan2012]
Tan, K. T., Chai, D., Kato, H., and Ong, S. K., "*Designing a Color Barcode for Mobile Applications*", Persuasive Computing, IEEE, Volume 11, Issue 2, pp. 50-55, February 2012

[Peiris2011]
Peiris, R. L., Fernando, O. N. N., and Cheok, A. D., "*A Dynamic AR Marker for a Paper Based Temperature Sensor*", Ambient Intelligence, Lecture Notes in Computer Science, Volume 7040, pp. 195-199, 2011

[Kato2010]
Kato, H., Tan, K. T., and Chaid D., "*Barcodes for Mobile Devices*", ISBN 978-0-521-88839-4, Cambridge University Press, 1st Edition, 2010

[Hill2009]
Hill, S., "*The future of anticounterfeiting, brand protection and security packaging V*", Pira International Market Report, October 2009

[Iqbal2006]
Iqbal, T., "*High Capacity Analog Channels for Smart Documents*", Phd thesis, Falultät Ingenieurwissenschaften der Universtität Duisburg-Essen, Aug. 17, 2006

[Herrigel2008]
Herrigel, A., "*Mobile Interaction and Document Authentication*", SECUDE International AG, The Conference on Optical Security and Counterfeit Deterrence, San Francisco, Calif., Jan. 23-25, 2008

[Reed1960]
Reed, I. S., and Solomon, G., "*Polynomial Codes Over Certain Finite Fields*", Journals of the Society for Industrial and Applied Mathematics, Volume 8, pp. 300-305, June 1960

[Ehlenbröker2012]
Ehlenbröker, J.-F., and Lohweg, V., "*Video-Based Data Transfer for Document Authentication*", 3. Jahresolloquium "Bildverarbeitung in der Automation (BVAu)", Centrum Industrial IT, Lemgo, inIT-Institut für industrielle Informationstechnik, November 2012

[Dougherty2003]
Dougherty, E. R., and Lotufo, R. A., "*Hands-on Morphological Image Processing*", ISBN 0-8194-4720-X, SPIE Tutorial Texts in Optical Engineering, Vol. TT59, SPIE Press, Bellingham, 2003

[Burger2009]
Burger, W., and Burge, M. J., "*Principles of Digital Image Processing/Fundamental Techniques*", ISBN 978-1-84800-190-9, Undergraduate Topics in Computer Science, Springer-Verlag London, London, 1st Edition, 2009

[Hamming1950]
Hamming, R. W., "*Error Detecting and Error Correcting Codes*", Bell Systems Technical Journal, Volume 29, Number 2, pp. 147-160, April 1950

The invention claimed is:

1. A system for coding, authentication and copy detection of printed documents, wherein a multiplicity of tiny two-dimensional printed code symbols, or byte-units, are scattered across a printed surface of a printed document to form a coding, each byte-unit consisting of a finder pattern to allow localization of the byte-unit and a single data block carrying one byte of data and one parity bit encoded as black and white one-bit modules,
    wherein the byte-units are scattered across the printed surface of the printed document in the form of printed dots each surrounded by a white quiet zone, the byte-units having a printing size such that the coding is not visible to the naked eye and that the byte-units are degraded as a result of copying the printed document, preventing readout of the coding on a copy of the printed document,
    and wherein the parity bit (p) is set to the following value, $$p = |(\Sigma_{i=1}^{8} d_i) \bmod 2 - 1|$$

where $d_i$ ($i = \{1, 2, \ldots, 8\}$; $d_i = \{0, 1\}$) are single data bits of the relevant byte of data carried by the byte-unit.

2. The system as defined in claim 1, wherein the byte-units are dispersed over the area of a printed text and used as replacement for i-dots, dots in punctuation marks and/or, depending on the language used, other dots used as diacritical mark.

3. The system as defined in claim 2, wherein an encoded data stream is formed by a plurality of byte-units that are dispersed over the area of the printed text.

4. The system as defined in claim 3, wherein each single alphanumeric character of the encoded data stream is mapped to a corresponding one of the byte-units.

5. The system as defined in claim 3, wherein identical byte-units are encoded multiple times in the printed document to achieve redundancy.

6. The system as defined in claim 5, wherein, for a given encoded data stream having a character length L and a given printed text having a data carrying capacity C, maximum redundancy is achieved when n=k+1 identical byte-units are printed for each character of the encoded data stream, k being an integer computed with the following formula:

$$k=[C/L]-1.$$

7. The system as defined in claim 1, wherein each byte-unit consists of 4×4 one-bit modules.

8. The system as defined in claim 7, wherein the finder pattern consists of seven black modules forming two solid lines at one corner of the byte-unit.

9. The system as defined in claim 1, wherein the parity bit is encoded in an inner area of each byte-unit.

10. The system as defined in claim 1, wherein each byte-unit has an overall printed area of less than 0.5 mm$^2$, with a byte-unit module size of the order of 0.1 mm×0.1 mm to 0.175 mm×0.175 mm.

11. The system as defined in claim 1, wherein the byte-units are printed with a printing resolution of the order of 1200 dpi.

12. Use of the system as defined in claim 1 to code, authenticate and detect copying of documents produced or processed by office printers and scanners.

13. The system as defined in claim 4, wherein the alphanumeric characters are encoded in ASCII-code.

14. A system for coding, authentication and copy detection of printed documents, wherein a multiplicity of tiny two-dimensional printed code symbols, or byte-units, are scattered across a printed surface of a printed document to form a coding, each byte-unit consisting of a finder pattern to allow localization of the byte-unit and a single data block carrying one byte of data and one parity bit encoded as black and white one-bit modules, wherein the byte-units are scattered across the printed surface of the printed document in the form of printed dots each surrounded by a white quiet zone, the byte-units having a printing size such that the coding is not visible to the naked eye and that the byte-units are degraded as a result of copying the printed document, preventing readout of the coding on a copy of the printed document, wherein the byte-units are dispersed over the area of a printed text and used as replacement for i-dots, dots in punctuation marks and/or, depending on the language used, other dots used as diacritical mark, wherein an encoded data stream is formed by a plurality of byte-units that are dispersed over the area of the printed text, wherein identical byte-units are encoded multiple times in the printed document to achieve redundancy, and wherein, for a given encoded data stream having a character length L and a given printed text having a data carrying capacity C, maximum redundancy is achieved when n=k+1 identical byte-units are printed for each character of the encoded data stream, k being an integer computed with the following formula:

$$k=[C/L]-1.$$

* * * * *